(12) United States Patent
Damstedt et al.

(10) Patent No.: US 12,448,288 B2
(45) Date of Patent: Oct. 21, 2025

(54) STARTUP METHODS FOR OXIDATION REACTOR

(71) Applicant: PRAXAIR TECHNOLOGY, INC., Danbury, CT (US)

(72) Inventors: Bradley D. Damstedt, Williamsville, NY (US); Lawrence E. Bool, East Aurora, NY (US); Michael F. Riley, Greenwood, IN (US)

(73) Assignee: Praxair Technology, Inc., Danbury, CT (US)

( * ) Notice: Subject to any disclaimer, the term of this patent is extended or adjusted under 35 U.S.C. 154(b) by 525 days.

(21) Appl. No.: 17/919,570

(22) PCT Filed: Jun. 9, 2021

(86) PCT No.: PCT/US2021/036612
§ 371 (c)(1),
(2) Date: Oct. 18, 2022

(87) PCT Pub. No.: WO2021/262440
PCT Pub. Date: Dec. 30, 2021

(65) Prior Publication Data
US 2023/0159329 A1 May 25, 2023

Related U.S. Application Data

(60) Provisional application No. 63/042,232, filed on Jun. 22, 2020.

(51) Int. Cl.
*C01B 3/36* (2006.01)

(52) U.S. Cl.
CPC ...... *C01B 3/363* (2013.01); *C01B 2203/0255* (2013.01); *C01B 2203/0811* (2013.01); *C01B 2203/1241* (2013.01)

(58) Field of Classification Search
CPC ............ C01B 3/363; C01B 2203/0255; C01B 2203/0811; C01B 2203/1241; C01B 2203/1604; C01B 2203/1628; C01B 2203/169; C01B 3/36; C01B 2203/061; C01B 2203/062; C10K 3/005
See application file for complete search history.

(56) References Cited

U.S. PATENT DOCUMENTS 4,881,949 A 11/1989 Brungel et al.
2012/0291351 A1 11/2012 Bool

FOREIGN PATENT DOCUMENTS

DE 278692 A3 5/1990
EP 0511479 A1 11/1992
WO 2009/095365 A2 8/2009

*Primary Examiner* — Jafar F Parsa
(74) *Attorney, Agent, or Firm* — Andrew G. Melick

(57) ABSTRACT

In a reactor for partial oxidation of feedstock employing a hot oxygen stream that is generated by a suitable burner, the same burner that generates and provides the hot oxygen stream in full-scale partial oxidation operation can be employed in the starting-up of the partial oxidation reactor by suitable control of the characteristics of the feed to the burner, or of the pressures.

10 Claims, 2 Drawing Sheets

STARTUP METHODS FOR OXIDATION REACTOR

RELATED APPLICATIONS

This application claims the benefit of International Application No. PCT/US 2021/036, 036,612, filed on Jun. 9, 2021, which claimed the benefit of U.S. Provisional Application Ser. No. 63/042,232, filed on Jun. 22, 2020, which are incorporated herein by reference.

FIELD OF THE INVENTION

The present invention relates to reactors, such as partial oxidation reactors in which carbonaceous feedstock is partially oxidized to produce syngas. The present invention relates in particular to such reactors in which the reaction is promoted by a stream of hot oxygen.

An advantageous embodiment of the invention employs a stream of hot oxygen that is generated by a separate reactor that is coupled to the oxidation reactor.

BACKGROUND OF THE INVENTION

Partial oxidation (POx) reactors typically operate at temperatures of 2400F or above. To start up operation of a POx reactor from a condition in which the temperature within the POx vessel (that is, the chamber in the POx reactor in which the partial oxidation reactions occur) is below the lowest temperature at which the POx reaction is to occur, the conventional methodology for starting up operation of the POx reactor involves heating the vessel interior at a prescribed rate, typically 100F/hr or less, to avoid damaging refractory lining in the POx vessel. Therefore, conventional practice to heat the vessel interior may include using a secondary, separate warmup burner, with associated control equipment and flame management. The secondary warmup burner may be integrated into a separate nozzle on the vessel, requiring additional penetrations through the wall of the POx vessel, and requiring purging when not in operation, along with a purging requirement for the primary burner during warmup. Or the primary POx burner might be physically removed and replaced with the warmup burner; but in this alternative, once warmup is complete, the system must be shut down in order to swap burners and start up in POx mode using the primary POx burner. The discontinuity in gas flow that is caused in this alternative is disruptive to the process. A large amount of soot is also produced when abruptly starting up the POx burner in what has become a hot reactor vessel.

BRIEF SUMMARY OF THE INVENTION

One aspect of the present invention is a method of operating a reactor in which carbonaceous feedstock is partially oxidized, comprising providing a burner and a reactor which are coupled together so that combustion in the burner produces a stream of products of the combustion that emerges from the burner and enters the interior of the reactor, feeding into the burner primary fuel and gaseous oxidant that contains oxygen and inert gas, at rates wherein the stoichiometric ratio of the gaseous oxidant relative to the primary fuel is greater than 1.0, preferably up to 8.0, and more preferably 3.0 to 4.5;

combusting in the burner the primary fuel and the oxygen in the gaseous oxidant to generate a product stream that emerges from the burner and contains combustion products including uncombusted oxygen, feeding auxiliary fuel into the product stream that emerges from the burner, at a rate wherein the stoichiometric ratio of said gaseous oxidant fed to the burner relative to the total of the primary fuel plus the auxiliary fuel is 0.85 to 1.15, and combusting the auxiliary fuel between the burner and the reactor or within the reactor with all of the uncombusted oxygen in the product stream, and feeding the products of said combustion into the interior of the reactor to heat the interior of the reactor, and then while continuing to feed the products of combustion of the product stream and the auxiliary fuel into the interior of the reactor, decreasing the content of inert gas in said gaseous oxidant while simultaneously increasing the mass flow rate of oxygen being fed in said gaseous oxidant to compensate for the reduction in inert gas and simultaneously increasing the mass flow rate of auxiliary fuel into said product stream, combusting the product stream that passes out of the burner, and passing the products of said combustion into the interior of the reactor to continue to increase the temperature of the interior of the reactor, and from the point at which the content of inert gas in the gaseous oxidant reaches zero, increasing the mass flow rates of primary fuel and of oxygen into the burner, preferably at a stoichiometric ratio to each other that is constant or that varies within a range whose highest value is 10% higher than its lowest value, and combusting the primary fuel and the oxygen in the burner to produce a stream of hot oxygen emerging from the burner and passing into the reactor, and increasing the mass flow rate of auxiliary fuel into the hot oxygen stream, preferably at a constant stoichiometric ratio to the oxygen in the hot oxygen stream, combusting the auxiliary fuel with all of the oxygen in the hot oxygen stream, and passing the products of said combustion into the interior of the reactor to continue to increase the operating temperature of the reactor; and when the temperature within the reactor reaches a temperature at which step (B) is to be performed, (B) feeding carbonaceous feed material to the reactor and partially oxidizing it in the reactor with said stream of hot oxygen produced by combustion of the gaseous oxidant with primary fuel in the burner and, if desired, with auxiliary fuel.

Another aspect of the present invention is a method of operating a reactor in which carbonaceous feedstock is partially oxidized, comprising (A) providing a burner and a reactor which are coupled together so that combustion in the burner produces a stream of products of the combustion that emerges from the burner and enters the interior of the reactor, (B) (1) feeding into the burner primary fuel and gaseous oxidant that contains oxygen, at rates wherein the stoichiometric ratio of the gaseous oxidant relative to the primary fuel is greater than 1.0, preferably up to 8.0, and more preferably 3.0 to 4.5;

(2) combusting in the burner the primary fuel and the oxygen in the gaseous oxidant to generate a product stream that emerges from the burner and contains combustion products including uncombusted oxygen, and (3) feeding auxiliary fuel into the product stream that emerges from the burner, at a rate wherein the stoichiometric ratio of said gaseous oxidant fed to the burner relative to the total of the primary fuel plus the auxiliary fuel is 0.85 to 1.15, and combusting the auxiliary fuel between the burner and the reactor or within the reactor to heat the interior of the reactor, and (C) while the pressure in the reactor is at a level which is less than the pressure at which step (D) is carried out, increasing the mass flow rates at which primary fuel and oxygen are fed to the burner and increasing the rate at which auxiliary fuel is fed into said product stream, thereby increasing the temperature of the combustion products that are fed into the reactor, while increasing the pressure in the reactor, until the temperature and the pressure in the reactor have increased to the values thereof at which step (D) is carried out, and (D) feeding carbonaceous feed material to the reactor and partially oxidizing it in the reactor with said stream of hot oxygen.

One preferred embodiment of carrying out step (C) of this aspect of the invention includes (C1) maintaining the pressure in the reactor at a constant first value which is less than the pressure at which step (D) is carried out, while increasing the mass flow rates at which primary fuel and oxygen are fed to the burner (preferably at a constant stoichiometric ratio relative to each other) and increasing the mass flow rate of auxiliary fuel (preferably at a constant stoichiometric ratio to the oxygen in said product stream), until the rates at which the primary fuel and auxiliary fuel and oxygen are fed to the burner cannot be increased at said first pressure value, (C2) increasing the pressure in the reactor to a higher value, which is less than the pressure at which step (D) is carried out while maintaining mass flow to the burner, and maintaining the pressure in the reactor at said higher value, while increasing the mass flow rates at which primary fuel and oxygen are fed to the burner and increasing the mass flow rate at which auxiliary fuel is fed into the product stream, while maintaining the pressure in the reactor at said higher value, until the rates at which the primary fuel and secondary fuel and oxygen are fed to the burner cannot be increased at said pressure, performing step (C2) at least once, until the temperature in the reactor is increased to the value at which step (D) is carried out.

As used herein, "hot oxygen stoichiometric ratio", also referred to as "HSR", means the ratio of moles of contained oxygen in the oxidant fed to the burner to the moles of oxygen that would be required to completely combust the fuel fed to the burner. As used herein, "total stoichiometric ratio", also referred to as "TSR", means the ratio of moles of contained oxygen in the oxidant fed to the burner to the moles of oxygen that would be required to completely combust the total of the fuel fed to the burner, plus the auxiliary fuel, plus all combustible feeds fed to the reactor.

DETAILED DESCRIPTION OF THE INVENTION

Figure 1:
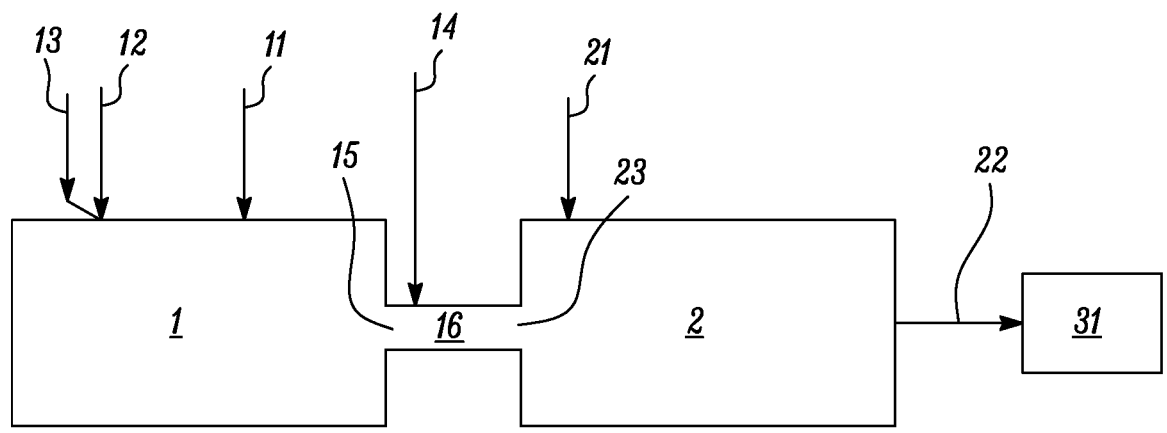
FIG. 1 is a flowsheet of an embodiment in which the present invention can be practiced.

The invention can be carried out in apparatus as described herein suitable for use as described. FIG. 1 represents such apparatus schematically.

As shown in FIG. 1, burner 1 is connected to reactor 2. Burner 1 and reactor 2 can be of conventional design, equipped with refractory linings that can withstand temperatures on the order of several thousand degrees Fahrenheit at which reactions can occur in each apparatus.

Primary fuel 11 is fed into burner 1, via a suitable feed line that is equipped with controls that can modulate the amount and rate at which fuel is fed into burner 1. Materials suitable as primary fuel 11 may be any suitable combustible fluid examples of which include natural gas, methane, propane, hydrogen and coke oven gas, or may be a process stream of hydrocarbons obtained from another chemical or petro-chemical processing operation. Preferably the primary fuel 11 is a gaseous fuel. Liquid fuels such as number 2 fuel oil or other oils may also be used.

Gaseous oxidant 12 is fed into burner 1 through a feed line which is equipped with controls that can modulate the amount and rate at which the gaseous oxidant is fed into burner 1. Preferably the gaseous oxidant 12 comprises at least 99 vol. % oxygen which is fed from a source such as a storage tank, pipeline, or air separation plant. However, the gaseous oxidant 12 may have an oxygen concentration of at least 30 volume percent and preferably at least 85 volume percent. The gaseous oxidant 12 fed into the burner 1 may have an initial velocity which is generally within the range of from 50 to 300 feet per second (fps) and typically will be less than 200 fps.

Inert gas 13 may also be fed to burner 1, as described below. Inert gas 13 can be fed into the gaseous oxidant 12 before passing into burner 1, as shown in FIG. 1, or the inert gas 13 can be fed directly into burner 1. The line from which inert gas 13 is fed is equipped with controls that can modulate the amount and rate at which inert gas is fed into burner 1. By "inert gas" is meant any gas more than 99 mole % of which does not react with either oxygen or fuel during the combustion of the fuel and oxygen in burner 1. Thus, "inert gas" includes a single substance that does not react with the oxygen or with the fuel, and "inert gas" includes a mixture of two or more substances each of which do not react with the oxygen or with the fuel. Preferred suitable inert gases include nitrogen, argon, mixtures of nitrogen and argon, and carbon dioxide or mixtures containing carbon dioxide, steam or steam containing mixtures.

Secondary fuel 14 can also be fed into the system, as described below, into the combustion products emerging through orifice 15, between orifice 15 and inlet 23 of reactor 2, or directly into reactor 2.

In general, subject to the varying operating conditions described below, primary fuel 11 and oxygen in gaseous oxidant 12 combust with each other in burner 1 to produce heat and product stream 16 which contains products of the combustion in burner 1.

As indicated above and as described more fully below, the present invention relates to using burner 1 (rather than any substitute or additional burner) to raise the temperature within the reactor 2 to a temperature at which oxidation or partial oxidation can be carried out in reactor 2. Reactor 2 represents any reactor suitable for carrying out, within reactor 2, partial oxidation of carbonaceous feedstock 21 which is fed into reactor 2 through a line which is equipped with controls that can modulate the amount and rate at which the feedstock is fed into furnace 2. The combustion products from burner 1 enter reactor 2 through inlet 23, and are used to partially oxidize the feedstock in reactor 2.

Examples of suitable feedstocks 21 to burner 2 include:
Natural gas, from any commercial source thereof;
the gaseous stream that is produced by a gasification reactor, in which solid hydrocarbon material such as biomass or solid fuel such as coal or lignin is gasified in a stream of gas usually comprising air, steam, and/or oxygen at a high enough temperature that at least a portion of the solid material is converted to a gaseous raw stream;

product streams and byproduct streams, which more often are gaseous but may be liquid and/or solids, that are produced in a petrochemical refinery or chemical plant;

coke oven gas, being the offgas stream that is produced in a reactor that heat treats coal to produce coke;

pyrolysis gas, being a hydrocarbon-containing gaseous stream that is produced in a reactor to heat treat solid carbonaceous material such as fossil fuel or biomass to devolatilize and partially oxidize the solid material;

Other possible feed streams include oils, such as pyrolysis oils, and liquid hydrocarbons.

Feedstock 21 can contain hydrogen and carbon monoxide (CO), and typically also contains one or more hydrocarbons such as alkanes and/or alkanols of 1 to 18 carbon atoms, and often contains one or more of carbon dioxide (CO2), and higher molecular weight hydrocarbons characterized as tars and/or soot.

The feedstock 21 can be at ambient temperature, but more often typically exhibits a temperature of between about 500° F. and 1600° F.

Feedstock 21 is fed into reactor 2 in which it is reacted with oxygen that is provided in stream 16 (produced as more fully described below) to produce additional amounts of hydrogen and carbon monoxide (CO) from components present in stream 21. If tars are present in stream 21, some or all of tars present can also be converted in reactor 2 to lower molecular weight hydrocarbon products.

The oxidized product stream which emerges as stream 22 from reactor 2 is typically subjected to one or more additional processing steps, such as cooling it and treating it to remove substances that should not be present when the stream is fed to its subsequent processing. It can be cooled by indirect heat exchange with water. It can be subjected to a catalytically mediated water-gas shift ("WGS") reaction to produce hydrogen from components in the stream, thereby providing a way to adjust the ratio of hydrogen to carbon monoxide in stream 13. Impurities that may be present such as particulates, acid gases including $CO_2$, ammonia, sulfur species, and other inorganic substances such as alkali compounds, can be removed in one or a series of units each intended to remove different ones of these impurities that are present or to reduce specific contaminants to the desired low levels. The resulting cooled, conditioned stream can then be subjected to further use, as fuel or as a reactant in subsequent chemical processing operations or separated to produce relatively pure streams of $H_2$ and/or CO. Preferred examples of such processing operations include use as feedstock to a Fischer-Tropsch process or other synthetic methodology to produce a liquid hydrocarbon or a mixture of liquid hydrocarbons. Other examples of useful treatment of stream 15 include the production of specific targeted chemical compounds such as methanol, ethanol, straight-chain or branched-chain or cyclic alkanes and alkanols containing 4 to 18 carbon atoms, aromatics, and mixtures thereof; or in the production of longer-chain products such as polymers.

In FIG. 1, element 31 designates any and all possible treatments of stream 22, examples of which are described herein. Where treatment 31 includes any equipment such as for storing, conveying, purifying, and/or reacting, of material from stream 22, the equipment can include provision for controlling (that is, increasing, decreasing, and/or maintaining) the pressure applied to the material, by which the pressure in reactor 2 can be increased, decreased, or maintained.

First Embodiment to Raise Reactor Temperature (Incorporating Inert Gas):

This embodiment increases the temperature in the reactor by increasing the temperature of the stream 16 that is produced in burner 1 and that is fed into reactor 2. As the practice of this embodiment begins, the temperature within reactor 2 is from ambient temperature, 32-120 F to any temperature up to the operating temperature.

In this embodiment, primary fuel and gaseous oxidant that contains oxygen and inert gas are fed into burner 1 at rates wherein the stoichiometric ratio of the gaseous oxidant relative to the primary fuel is greater than 1.0, preferably up to 8.0, and more preferably 3.0 to 4.5. At the beginning of this sequence of steps, the inert gas (whether one substance or a mixture of substances) can comprise in the aggregate 25 vol. % to 75 vol. % of the gaseous oxidant, and preferably 40 vol. % to 60 vol. % of the gaseous oxidant.

The primary fuel and the oxygen in the gaseous oxidant combust within the burner. The combustion generates a product stream 16 that emerges from the burner. Product stream 16 contains combustion products including uncombusted oxygen, carbon dioxide, water vapor, and likely also contains carbon monoxide and carbon-containing free radicals (such as $:CH_2$, :OH, and the like). The hot combustion products produced in this way are passed from the burner 1 as stream 16 into reactor 2 through and out of a suitable orifice 15 as a high velocity stream having a temperature of at least 2000° F. up to 4700° F. Generally the velocity of the stream 16 as it passes out of orifice 15 will be within the range of from 500 to 4500 feet per second (fps). The stream that emerges from orifice 15 may also react with auxiliary fuel 14, as described in more detail below.

Auxiliary fuel 14 is fed into the product stream 16 that emerges from the burner 1, at a rate wherein the stoichiometric ratio of said uncombusted oxygen relative to the auxiliary fuel and any uncombusted primary fuel in the product stream 16 is close to 1.0 and preferably 0.9 to 1.1. The auxiliary fuel is combusted with oxygen in stream 16, between the burner 1 and the reactor 2 or within the reactor 2 (or in both locations).

While the products of combustion of the product stream and the auxiliary fuel are fed into the interior of the reactor, the content of inert gas in said gaseous oxidant is reduced. This reduction can be carried out steadily, or intermittently (wherein it is reduced, then held constant, then reduced again, held constant again, and the like). In general, the rate at which the mass flow rate of the inert gas is decreased is in proportion to increases in firing rate as the temperature in the reactor is increased, occurring smoothly over a period of many hours.

Simultaneously while the inert gas content of the gaseous oxidant is being reduced, the mass flow rate of oxygen being fed in said gaseous oxidant is increased to compensate for the reduction in the amount of inert gas that is present; and simultaneously the mass flow rate of the auxiliary fuel into said product stream is also increased. Combustion of the primary fuel in burner 1 continues, and combustion of the product stream 16 that passes out of the burner continues. The products of said combustion continue to pass into the interior of the reactor 2, which continues to increase the temperature of the interior of reactor 2 because of the increasing amounts of fuel available to be combusted.

The operator will typically vary the firing rate of the HOB while maintaining the HSR and TSR to match the vessel temperature setpoint, preferably utilizing an automatic temperature controller that automatically maintains the HSR and the TSR.

Typical rates of increase of the temperature in the POx reactor are between 10-100° F./hr. The temperature can be increased gradually and steadily, or it can be increased intermittently by which is meant that periods during which the temperature is increased steadily are interspersed with periods during which the temperature is not increased, as even in the periods in which the temperature is not increased the reactor continues to be heated.

Eventually the content of inert gas in the gaseous oxidant fed to burner 1 reaches zero. From that point onward, the flows of primary fuel and of oxygen into the burner are continued, at mass flow rates that continue to increase (again, either continually at a steady rate or varying rate, or intermittently), at rates at which all of the primary fuel is combusted and preferably at a constant stoichiometric ratio of primary fuel to oxygen in stream 11. Combustion of the primary fuel and the oxygen in the burner is continued, and continues to produce stream 16 which now is of hot oxygen emerging from the burner and passing into the reactor 2. At this time the flow of auxiliary fuel is also continued into the hot oxygen stream, at a mass flow rate that increases (at a steady rate, or at a varying rate, or intermittently), preferably at a constant stoichiometric ratio to the oxygen in the hot oxygen stream, and the auxiliary fuel is combusted with all of the oxygen in the hot oxygen stream. The products of this combustion are passed into the interior of the reactor to continue to increase the operating temperature of the reactor.

When the temperature within the reactor 2 reaches a temperature at which oxidation or partial oxidation of feedstock 21 is to begin in reactor 2, the flow of feedstock 21 is begun, which is oxidized or partially oxidized in the reactor 2 with the stream of hot oxygen produced by combustion of the gaseous oxidant with primary fuel in burner 1 and, if desired, with auxiliary fuel. The reactor operator will select the desired reactor temperature at which partial oxidation is begun. This temperature varies of course with the feedstock composition and with the desired characteristics of the operation and of the reactor product. Recognizing these considerations, the temperature at which partial oxidation begins may often be in the range of 2400-2600° F.

Second Embodiment to Raise Reactor Temperature (Incorporating Pressure Control):

This embodiment increases the temperature in the reactor by increasing the temperature of the stream 16 that is produced in burner 1 and that is fed into reactor 2. As the practice of this embodiment begins, the temperature within reactor 2 is from ambient temperature, 32-120° F. to any temperature up to the operating temperature.

In this embodiment, primary fuel and gaseous oxidant that contains oxygen are fed into burner 1 at rates wherein the stoichiometric ratio of the gaseous oxidant relative to the primary fuel is greater than 1.0, preferably up to 8.0, and more preferably 3.0 to 4.5. This embodiment does not require use of inert gas as described in the previous embodiment. However, the two embodiments can be performed simultaneously.

The primary fuel and the oxygen in the gaseous oxidant combust within the burner. The combustion generates a product stream 16 that emerges from the burner. Product stream 16 contains combustion products including uncombusted oxygen, carbon dioxide, water vapor, and likely also contains carbon monoxide and carbon-containing free radicals (such as $:CH_2$, $:OH$, and the like). The hot combustion products produced in this way are passed from the burner 1 as stream 16 into reactor 2 through and out of a suitable orifice 15 as a high velocity stream having a temperature of at least 2000° F. up to 4700° F. Generally the velocity of the stream 16 as it passes out of orifice 15 will be within the range of from 500 to 2500 feet per second (fps). The stream that emerges from orifice 15 may also react with auxiliary fuel 14, as described in more detail below.

Auxiliary fuel 14 is fed into the product stream 16 that emerges from the burner 1, at a rate wherein the stoichiometric ratio of said uncombusted oxygen relative to the auxiliary fuel and any uncombusted primary fuel in the product stream 16 is close to 1.0 and preferably 0.9 to 1.1. The auxiliary fuel is combusted with all of the uncombusted oxygen in stream 16, between the burner 1 and the reactor 2 or within the reactor 2 (or in both locations).

At this point in the procedure, the pressure within the reactor 2 (which may be referred to as the "initial reactor pressure") is less than the pressure at which oxidation or partial oxidation of feedstock in reactor 2 will be carried out. Typically, the initial reactor pressures at the start is from atmospheric to 50 psig. Typically, the reactor pressure when the reactor is ready for carrying out partial oxidation is 50 psig to 600 psig or more.

While the pressure in the reactor is at the initial reactor pressure, the mass flow rates at which primary fuel and oxygen are fed to the burner are increased, and the mass flow rate at which auxiliary fuel is fed into said product stream is increased, thereby increasing the temperature of the combustion products that are fed into the reactor, while the pressure in the reactor is also being increased to the value at which the reactor 2 will begin oxidation or partial oxidation of feedstock 21. The operator will control the rate of pressure increase so as to provide a controlled increase of the temperature.

The pressure in reactor 2 is increased, maintained at a given value, or decreased, by adjustment of a pressure control valve anywhere downstream from reactor 2 that controls pressure in the reactor 2.

When the temperature and the pressure in the reactor have increased to the values thereof at which oxidation or partial oxidation is carried out, feeding of the carbonaceous feedstock to the reactor is begun and oxidation of the feedstock with the stream of hot oxygen is begun.

Typical values of the rate of pressure increase in the POx reactor are on the order of no more than 5 psi/min, but can be whatever the operating practice of the plant is. This will depend on the ability of the flow controllers in the system to adapt to changes in pressure. Typically, the the rate of temperature increase in the POx reactor is 10 to 100° F./hr One preferred embodiment of carrying out this aspect of the invention includes maintaining the pressure in the reactor at a constant first value which is less than the pressure at which oxidation or partial is to be carried out, while increasing the mass flow rates at which primary fuel and oxygen are fed to the burner (preferably at a constant stoichiometric ratio relative to each other) and increasing the mass flow rate of auxiliary fuel (preferably at a constant stoichiometric ratio to the oxygen in said product stream), until the rates at which the primary fuel and auxiliary fuel and oxygen are fed to the burner cannot be increased at said first pressure value. Typical values of HSR in the burner are in the range of 3.0 to 8.0. Typical values of TSR (including the auxiliary fuel) are in the range of 0.9-1.15.

Next, the pressure in the reactor is increased to a higher value, preferably a value which is less than the pressure at which oxidation or partial oxidation is to be carried out, and maintaining the pressure in the reactor at said higher value, while the mass flow rates at which primary fuel and oxygen are fed to the burner are increased and the mass flow rate at which auxiliary fuel is fed into the product stream is increased, while maintaining the pressure in the reactor at said higher value, until the rates at which the primary fuel and secondary fuel and oxygen are fed to the burner cannot be increased at said pressure.

The aforementioned steps can be performed any number of times, by which the temperature and the pressure within reactor 2 are gradually increased (whether the increases are steadily at a constant rate, steadily at a varying rate, or intermittently). Where there is any intermittent operation, in which the pressure in reactor 2 is held at a fixed value for a period of time before it is increased, it is preferred that there are 1 to 6 steps in which the pressure is held at a value higher than in the previous step, while the flows of oxygen and primary fuel and auxiliary fuel are increased until they cannot be increased any further at the given pressure value at which point the pressure in reactor 2 is again increased. Eventually, the temperature and the pressure in reactor 2 become increased to values at which the desired oxidation or partial oxidation is carried out in reactor 2.

EXAMPLE

Figure 2:
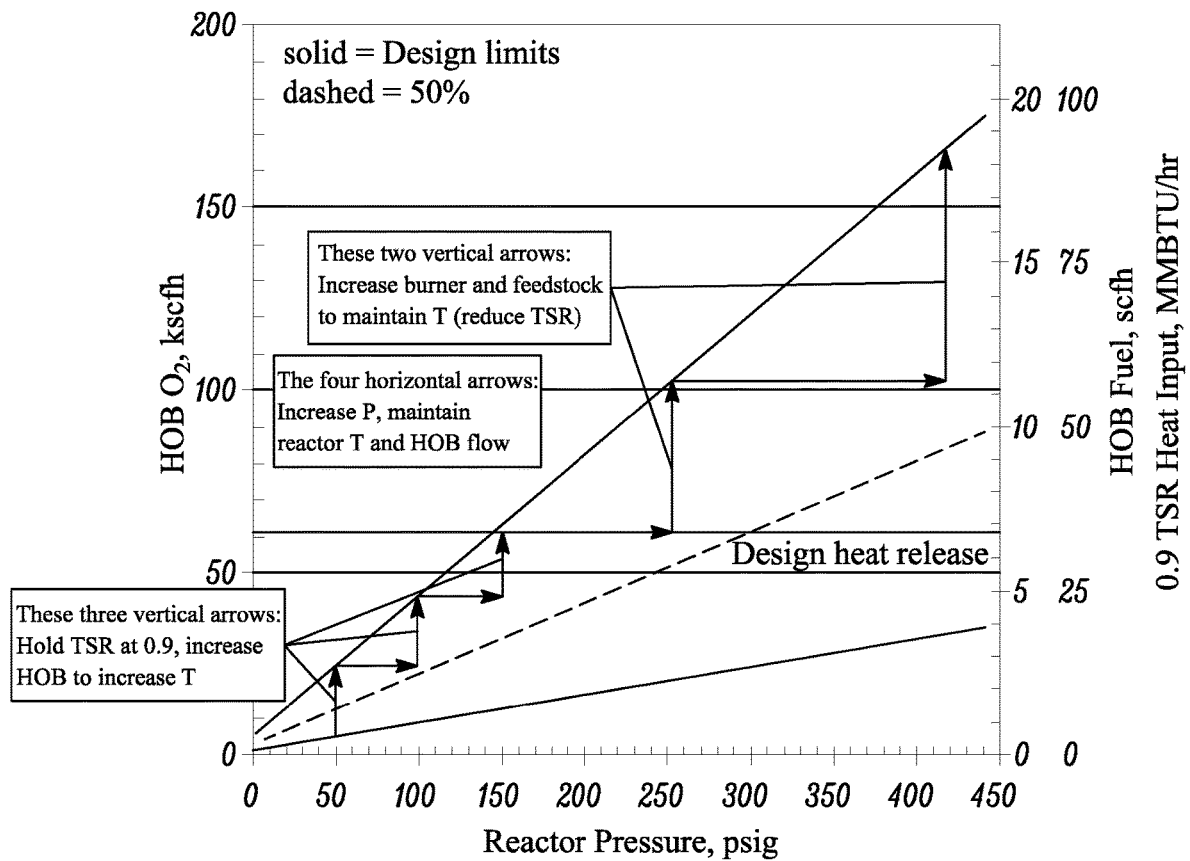
FIG. 2 is a graph depicting operating conditions of an embodiment of the invention.

This example and FIG. 2 illustrate relying on pressure control to heat up the POx reactor. The design condition for this example was a POx reactor to run using 170,000 scfh of oxygen at 420 psig. Design limits are shown by two lines, one being the upper design limit line which extends from near the origin (0,0) toward 20 on the vertical scale to the right, and the other being the lower design limit line which extends from near the origin (0,0) toward about 4 on the vertical scale to the right. The design limit lines show that at the minimum operating rate of the burner 1, the firing rate would be too high. Decreasing the pressure in the POx reactor to 50 psig allows an acceptable firing rate at the minimum O2 feed rate for that pressure. Once the burner is ignited to generate the hot oxygen stream 16 and auxiliary fuel is provided, the firing rate and pressure can be increased to step the POx reactor interior through the warmup (to the line labeled "design heat release") and subsequent transition to normal operation.

In FIG. 2, the arrow extending vertically from 50 psig on the reactor pressure scale to the upper design limit line, and the arrow extending vertically from 100 psig on the reactor pressure scale to the upper design limit line, and the arrow extending vertically from 150 psig on the reactor pressure scale to the upper design limit line and the Design heat release line, depict operating conditions in which the TSR is held constant at a value of 0.9, and the operating firing rate of the hot oxygen burner ("HOB") is increased to increase the temperature of the POx reactor. The arrows extending horizontally toward the right of each of the aforementioned vertical arrows depict that intermittently between the stages in which the TSR is held constant, the pressure of the POx reactor is instead increased while the POx reactor temperature and the HOB firing rate are held constant. The horizontally extending arrow that lies along the Design heat release line to about 250 psig reactor pressure, the vertical line at about 250 psig reactor pressure that extends from the Design heat release line up to the upper design limit line, the horizontal line that extends from the upper design limit line at about 250 psig reactor pressure to about 420 psig reactor pressure, and the vertical line extending from about 420 psig reactor pressure up to the upper design limit line, depict the alternatingly increasing reactor pressure while maintaining reactor temperature and HOB flow/firing rate (the horizontal lines) and increasing burner and feedstock flow rates to reduce the TSR (the vertical lines).

What is claimed is:
1. A method of operating a reactor in which carbonaceous feedstock is partially oxidized, comprising
providing a burner and a reactor which are coupled together so that combustion in the burner produces a stream of products of the combustion that emerges from the burner and enters the interior of the reactor,
feeding into the burner primary fuel and gaseous oxidant that contains oxygen and inert gas, at rates wherein the stoichiometric ratio of the gaseous oxidant relative to the primary fuel is greater than 1.0;
combusting in the burner the primary fuel and the oxygen in the gaseous oxidant to generate a product stream that emerges from the burner and contains combustion products including uncombusted oxygen,
feeding auxiliary fuel into the product stream that emerges from the burner, at a rate wherein the stoichiometric ratio of said gaseous oxidant fed to the burner relative to the total of the primary fuel plus the auxiliary fuel is 0.85 to 1.15, and combusting the auxiliary fuel between the burner and the reactor or within the reactor with all of the uncombusted oxygen in the product stream, and feeding the products of said combustion into the interior of the reactor to heat the interior of the reactor, and then
while continuing to feed the products of combustion of the product stream and the auxiliary fuel into the interior of the reactor, decreasing the content of inert gas in said gaseous oxidant while simultaneously increasing the mass flow rate of oxygen being fed in said gaseous oxidant to compensate for the reduction in inert gas and simultaneously increasing the mass flow rate of auxiliary fuel into said product stream, combusting the product stream that passes out of the burner, and passing the products of said combustion into the interior of the reactor to continue to increase the temperature of the interior of the reactor, and
from the point at which the content of inert gas in the gaseous oxidant reaches zero, increasing the mass flow rates of primary fuel and of oxygen into the burner, at a stoichiometric ratio to each other that is constant or that varies within a range whose highest value is 10% higher than its lowest value, and combusting the primary fuel and the oxygen in the burner to produce a stream of hot oxygen emerging from the burner and passing into the reactor, and increasing the mass flow rate of auxiliary fuel into the hot oxygen stream, at a constant stoichiometric ratio to the oxygen in the hot oxygen stream, combusting the auxiliary fuel with all of the oxygen in the hot oxygen stream, and passing the products of said combustion into the interior of the reactor to continue to increase the operating temperature of the reactor; and
when the temperature within the reactor reaches a temperature at which step (B) is to be performed,
(B) feeding carbonaceous feed material to the reactor and partially oxidizing it in the reactor with said stream of hot oxygen produced by combustion of the gaseous oxidant with primary fuel in the burner and, if desired, with auxiliary fuel.
2. A method of operating a reactor in which carbonaceous feedstock is partially oxidized, comprising
(A) providing a burner and a reactor which are coupled together so that combustion in the burner produces a stream of products of the combustion that emerges from the burner and enters the interior of the reactor,

(B) (1) feeding into the burner primary fuel and gaseous oxidant that contains oxygen, at rates wherein the stoichiometric ratio of the gaseous oxidant relative to the primary fuel is greater than 1.0;

(2) combusting in the burner the primary fuel and the oxygen in the gaseous oxidant to generate a product stream that emerges from the burner and contains combustion products including uncombusted oxygen, and (3) feeding auxiliary fuel into the product stream that emerges from the burner, at a rate wherein the stoichiometric ratio of said uncombusted oxygen relative to the auxiliary fuel and any uncombusted primary fuel in the product stream is 0.9 to 1.1, and combusting the auxiliary fuel between the burner and the reactor or within the reactor with all of the uncombusted oxygen in the product stream to heat the interior of the reactor, and (C) while the pressure in the reactor is at a level which is less than the pressure at which step (D) is carried out, increasing the mass flow rates at which primary fuel and oxygen are fed to the burner and increasing the rate at which auxiliary fuel is fed into said product stream, thereby increasing the temperature of the combustion products that are fed into the reactor, while increasing the pressure in the reactor, until the temperature and the pressure in the reactor have increased to the values thereof at which step (D) is carried out, and (D) feeding carbonaceous feed material to the reactor and partially oxidizing it in the reactor with said stream of hot oxygen.

3. A method according to claim 2 wherein step (C) includes (C1) maintaining the pressure in the reactor at a constant first value which is less than the pressure at which step (D) is carried out, while increasing the mass flow rates at which primary fuel and oxygen are fed to the burner and increasing the mass flow rate of auxiliary fuel, until the rates at which the primary fuel and auxiliary fuel and oxygen are fed to the burner cannot be increased at said first pressure value, (C2) increasing the pressure in the reactor to a higher value, which is less than the pressure at which step (D) is carried out, and maintaining the pressure in the reactor at said higher value, while increasing the mass flow rates at which primary fuel and oxygen are fed to the burner and increasing the mass flow rate at which auxiliary fuel is fed into the product stream, while maintaining the pressure in the reactor at said higher value, until the rates at which the primary fuel and secondary fuel and oxygen are fed to the burner cannot be increased at said pressure, performing step (C2) at least once, up to a total of 6 times, until the temperature in the reactor is increased to the value at which step (D) is carried out.

4. The method of claim 1, 2, or 3 wherein the stoichiometric ratio of the gaseous oxidant to the primary fuel is up to 8.0.

5. The method of claim 1, 2, or 3 wherein the stoichiometric ratio of the gaseous oxidant to the primary fuel is up to 3.0 to 4.5.

6. The method of claim 1, 2, or 3 wherein the carbonaceous feedstock comprises any of natural gas; a gaseous stream produced by gasification of biomass, coal, or lignin; coke oven gas; or pyrolysis gas.

7. The method of claim 1, 2, or 3 wherein the inert gas comprises one or more of nitrogen, argon, carbon dioxide, or steam.

8. The method of claim 1, 2, or 3 wherein the mass flow rate of auxiliary fuel into the hot oxygen stream is increased at a constant stoichiometric ratio to the oxygen in the hot oxygen stream.

9. The method of claim 3 wherein in step (C1) the pressure in the reactor is maintained at a constant first value which is less than the pressure at which step (D) is carried out, while the mass flow rates at which primary fuel and oxygen are fed to the burner are increased at a constant stoichiometric ratio relative to each other.

10. The method of claim 3 wherein in step (C1) the pressure in the reactor is maintained at a constant first value which is less than the pressure at which step (D) is carried out, while the mass flow rate of auxiliary fuel is increased at a constant stoichiometric ratio to the oxygen in said product stream.

* * * * *